United States Patent [19]
Barta

[11] 4,301,451
[45] Nov. 17, 1981

[54] ERASURE METHOD FOR MEMORY-TYPE EL DISPLAY DEVICES
[75] Inventor: Gary S. Barta, Portland, Oreg.
[73] Assignee: Tektronix, Inc., Beaverton, Oreg.
[21] Appl. No.: 100,170
[22] Filed: Dec. 4, 1979
[51] Int. Cl.³ .......................................... H05B 37/00
[52] U.S. Cl. ................................ 340/781; 315/169.3; 340/805
[58] Field of Search ...................... 340/781, 805, 779; 315/169.3

[56] References Cited
U.S. PATENT DOCUMENTS
3,975,661  8/1976  Kanatan et al. ............... 340/781 X
4,206,460  6/1980  Yasuda et al. ..................... 340/781

Primary Examiner—David L. Trafton
Attorney, Agent, or Firm—John D. Winkelman

[57] ABSTRACT

An improved method of completely erasing images stored by memory-type electroluminescent display panels. The method comprises interrupting the a.c. sustaining bias signal normally applied to the panel and impressing an erase pulse that is opposite in polarity to the last-preceding sustaining pulse or cycle. The amplitude and duration of the erase pulse are chosen to effect relaxation of the EL layer's internal field. The sustaining bias signal is then restored to place the panel in an erased, ready-to-write condition.

8 Claims, 4 Drawing Figures

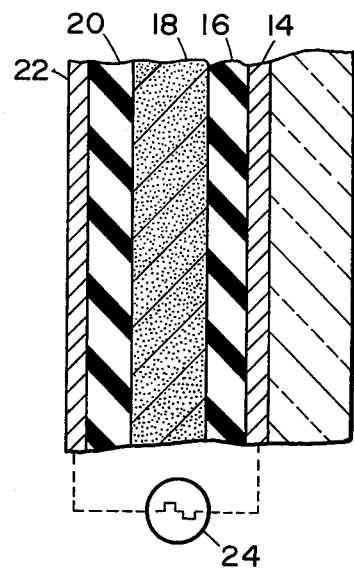
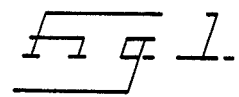
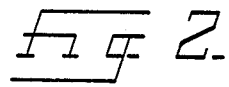
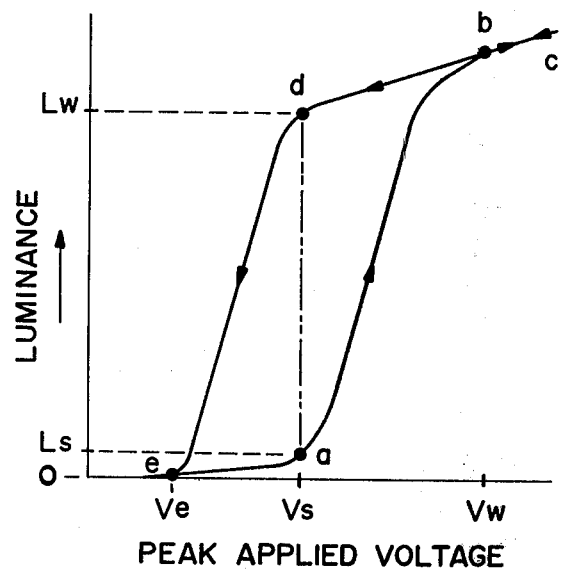
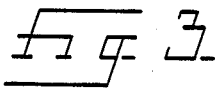
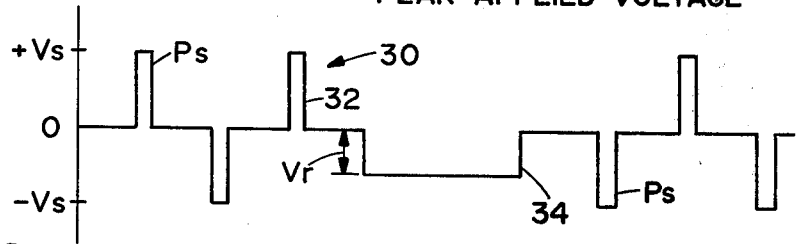
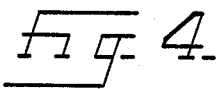
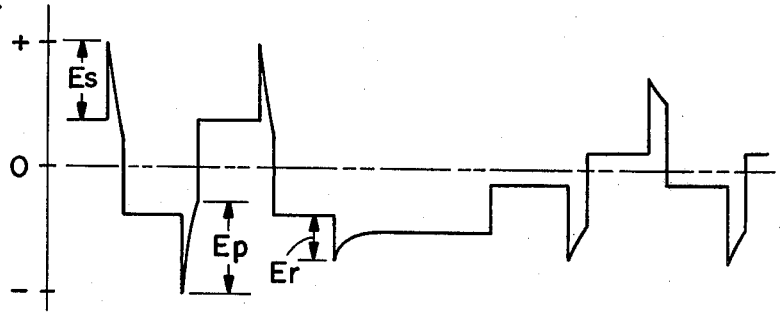

ERASURE METHOD FOR MEMORY-TYPE EL DISPLAY DEVICES

BACKGROUND AND OBJECTS OF THE INVENTION

The present invention relates generally to thin-film electroluminescent (EL) display devices of the type having an inherent "memory", or voltage vs. brightness hysteresis. More particularly, the invention relates to an improved method of erasing such devices.

Reports of long service life and an inherent memory capability have focused increased attention on a.c.-driven ZnS:Mn thin film EL devices in recent years. The hysteretic behavior of the brightness vs. applied voltage relationship of such devices (which is responsible for the memory effect) was first described by Y. Yamauchi et al. in the 1974 International Electron Devices Meeting Digest, pp. 348–351. Since that time, memory-type ZnS:Mn thin film EL devices have been used in a variety of information display applications. For example, C. Suzuki et al. have published descriptions of X-Y matrix EL panels with inherent memory for displaying alphanumeric characters (1976 S.I.D. International Symposium Digest pp. 50, 51) and television pictures (*Information Display*, Spring, 1977, pp. 14–19). U.S. Pat. No. 4,149,108 to I. Chang discloses a multistable cathode-ray tube that uses an a.c. thin-film EL panel as the storage display target. The electroluminescent target of the Chang CRT is addressed directly by the tube's electron beam. U.S. application Ser. No. 922,950, filed July 10, 1978 in my name and assigned to the assignee of the present invention, describes an EL storage CRT with a target comprising a double insulated ZnS:Mn thin-film panel having a layer of a UV-emitting phosphor on the input side. Rather than being exposed to direct bombardment by the electron beam the EL panel is addressed by ultraviolet light emitted from the intermediate phosphor layer.

With all such devices there is a need to erase stored information. The conventional method of erasing an a.c. thin-film EL display panel is to reduce the amplitude of the applied a.c. signal, which is normally maintained at an image-sustaining level Vs, to a value below the extinction voltage Ve of the device. At or below Ve, the a.c. field across the thin-film EL layer is insufficient to maintain luminescence and the entire panel becomes dark, (unwritten). The erase cycle is completed by raising the applied signal potential to Vs, which returns the panel to an erased, ready-to-write condition.

Although it is easy enough to do, the above-described procedure has a significant drawback—a faint, residual image of the previously displayed information often remains when the applied voltage is returned to Vs. The residual image problem can be eliminated by adding a preliminary step to the erasing process: increasing the applied potential to a value Vw high enough to place the entire panel in a bright, fully-written condition. Then, when the a.c. voltage is dropped to Ve and returned to Vs, the panel will be fully erased and free of residual images. Unfortunately, however, the added step produces a momentary bright "flash" that is unpleasant and greatly increases visual fatigue. The effect is particularly objectionable with large size display panels, or displays used in low ambient light conditions.

Thus, there is a demonstrated need for an improved method of erasing memory-type electroluminescent display devices—one that is free from the drawbacks of the methods described above. A principal object of the present invention is to meet this need in a practical and satisfactory manner.

A more specific object of the invention is to provide a method for erasing memory-type EL panels that results in complete erasure of all previously-displayed information without increasing visual fatigue.

Another object of the invention is to provide an erasure method that is simpler and less costly to implement than prior art methods.

Still another object of the invention is to provide an improved method of total erasure that does not require any change in the amplitude of the a.c. voltage applied to the panel.

A further object of the invention is to provide an improved erasure method that is applicable in all memory-type thin-film EL panel applications.

SUMMARY OF THE INVENTION

According to a preferred embodiment of the present invention, which is described in greater detail below, total erasure of a memory-type ZnS:Mn thin-film EL panel is achieved by applying an erase pulse opposite in polarity to the last-preceding pulse or cycle of the sustaining bias signal, and of sufficient amplitude and duration to relax the internal field across the EL layer. The sustaining bias is then reapplied to place the panel in an erased and ready-to-write condition. The polarity of the first sustaining bias pulse or cycle following the erase pulse is unimportant and may be of the same or the opposite polarity. For the sake simplicity and convenience, the erase pulse may be of the same amplitude as the pulses of the sustaining bias signal.

Other features, advantages and objects of my invention will be apparent as the following detailed description is read in conjunction with the accompanying drawing.

BRIEF DESCRIPTION OF THE DRAWING

FIG. 1 is a fragmentary, cross-sectional view of a memory-type electroluminscent display panel, FIG. 2 shows a plot of display brightness versus applied voltage for the FIG. 1 EL panel;

FIG. 3 illustrates the waveform of voltage pulses applied to the FIG. 1 panel during a complete erase cycle; and FIG. 4 depicts the internal electric field produced in the active layer of the EL panel by application of the FIG. 3 waveform.

DETAILED DESCRIPTION

Referring to the drawings, FIG. 1 shows a thin-film electroluminescent display panel 10 of known construction. Panel 10 includes a transparent first electrode 14 of indium oxide ($In_2O_3$) or indium-tin oxide (InSnOx) deposited on a planar glass substrate 12. Overlaying electrode 14 is a first insulating layer 16 of a high dielectric strength material such as yttrium oxide ($Y_2O_3$), silicon nitride ($Si_3N_4$) or aluminum oxide ($Al_2O_3$). An active thin-film layer 18 of maganese-activated zinc sulfide (ZnS:Mn) deposited on the first insulating layer is covered by a second insulating layer 20 of $Y_2O_3$ or the like. A second electrode 22, suitably of aluminum, overlays insulating layer 20 and completes the basic structure. The fabrication of such panels is conventional, having been described in the above-mentioned Yamauchi et al. paper and numerous subsequent publications, and forms no part of the present invention. By way of example only, a typical thin-film EL panel of the double-insulated described type may be constituted as follows:

| Element | Materials | Thickness, A |
| --- | --- | --- |
| 1st. Electrode 14 | $SnO_2$ | 300–500 |
| 1st. Insul. Layer 16 | $Y_2O_3$ | 2000–3000 |
| Active Layer 18 | Zns:Mn | 3500–7000 |
| 2nd Insul. Layer 20 | $Y_2O_3$ | 2000–3000 |
| 2nd Electrode 22 | Al | 400–1000 |

Such a device emits yellow light when activated, and exhibits a hysteretic luminance vs. voltage behavior that is illustrated (in somewhat idealized form) in FIG. 2. As the peak amplitude of applied a.c. voltage pulses (as from a source 24) is increased, there is a slow increase in emitted light until the voltage exceeds a certain threshold value, indicated at point "a" on the curve. Above this "upward" threshold value, luminance increases very rapidly as trapped electrons are liberated from the active EL layer. Liberation of the trapped electrons is essentially complete at point "b" on the curve, and further voltage increases (to point "c" and beyond provide only small gains in display brightness. Upon reducing the amplitude of the applied voltage pulses, luminance decreases at a slow, or relatively constant rate until a "downward" threshold value is reached at point "d", where trapping rapidly reduces the electrons available for excitation of the Mn atoms. Below point "d", further small reductions in the applied voltage rapidly decrease the device's luminance, until at point "e" the panel is in a "dark", or erased, state.

For operation as a storage display device, a train 30 of sustained, alternating polarity voltage pulses Ps (FIG. 3) of an amplitude Vs is applied to panel 10 by source 24. The value of Vs, which may be referred to as the bias voltage, is set in the vicinity of the previously-mentioned upward threshold value. Before information is written on the panel, its luminance is sustained by the pulse train at a relatively low level, Ls, as shown in FIG. 2. Areas of the EL layer that are subsequently switched "on" by a writing electron beam, ultraviolet light or a transient voltage pulse settle at a high luminance level, Lw, and are sustained there by the pulses Ps.

According to the present invention, panel 10 is totally erased without leaving residual images by interrupting the train of sustaining pulses and applying an erase pulse opposite in polarity to the last-preceding pulse Ps. The erase pulse amplitude and duration are selected to produce relaxation of the internal field across EL layer 18. Following the erase pulses, the train of sustaining pulses is reapplied to place the panel in a ready-to-write condition.

A representative erase cycle for a memory-type thin-film EL display panel is shown in FIG. 3. It will be assumed that the panel initially is in a fully written condition, and thus is being sustained at luminance level Lw by the alternating polarity pulses Ps forming pulse train 30. Following a positive sustaining pulse 32, the train is interrupted by a negative erase pulse 34. The amplitude and the duration of the erase pulse are emperically selected to relax the internal field across the thin-film EL layer before the sustaining pulse train is reapplied. To simplify implementation of the method, the amplitude Vr of the erase pulse may be the same as that of the sustaining pulses, but should not exceed Vs.

Upon the conclusion of pulse 34, a train of sustaining pulses Ps is reapplied to the display panel. The train may begin with a pulse of either polarity without affecting erasure of the panel.

A plot of the internal electric field in the ZnS:Mn active layer during the FIG. 3 erase cycle is shown in FIG. 4. As will be observed, each sustaining pulse Ps steps the layer's internal field by an amount Es, which adds to the polarization field Ep during the next pulse to enhance luminance. Since the thin-film panel is a capacitive device, erase pulse 34 steps the internal field by an amount Er. This increases the field, causing the EL layer to emit light and discharge. The higher the field, the greater the emission and the faster the discharge, which reduces the EL layer's internal field. When the erase pulse terminates and the next sustain pulse Ps is applied, the total field is insufficient to sustain electroluminescence at the Lw level. Thus, the active layers free electrons are trapped out and the panel returns to the lower luminance level Ls. The FIG. 4 plot suggests, as one would expect, that there is a minimum value for Vr, below which erasure does not occur. This value will vary, depending on the construction of the EL panel, and is best determined by trial and error.

Visually, erasure of an EL panel by the method of the invention is seen as a rapid, complete disappearance of written images without any annoying flash. The described technique is applicable to any type of hysteretic thin-film EL device, including those incorporating a layer of ultraviolet-emitting phosphor overlying the second conductive layer for conversion of incident electrons to UV light. Such a device, used as a CRT storage target, is described in my above-mentioned application, Ser. No. 922,950. One feature of the invention applicable only to a UV-addressed hysteretic EL panel is that writing can take place during the erase pulse. Portions of the panel thus written will remain stored, while all previously written information will be erased.

I claim as my invention:

1. A method of operating an electroluminescent device exhibiting voltage/luminance hysteresis, said device comprising an active layer of electroluminescent material, first and second electrodes of conductive material, each electrode being disposed opposite a different face of the active layer, and first and second dielectric layers separating and insulating said electrodes from the active layer, said method comprising the steps of:
    (a) applying a sustaining voltage signal to the active layer through said electrodes, said signal including alternating polarity pulses having an amplitude sufficient to bias the device into its region of voltage/luminance hysteresis,
    (b) discontinuing application of the sustaining signal,
    (c) applying an erase pulse that reduces the active layer's internal electric field to a level such that reapplication of the sustaining voltage signal will cause luminescent regions of the device to be extinguished, said pulse having (i) an amplitude not exceeding that of the sustaining signal, (ii) a duration greater than that of the individual pulses in said sustaining signal, and (iii) a polarity opposite that of the last preceding pulse of said signal, and
    (d) reapplying the sustaining signal.

2. The method of claim 1, wherein said active layer consists essentially of manganese-activated zinc sulfide.

3. The method of claim 1, wherein said sustaining voltage signal is in the form of a train composed of spaced, alternating polarity pulses.

4. The method of claim 3, wherein said pulses have a substantially rectangular waveform.

5. The method of claim 1, wherein said erase pulse has an amplitude substantially equal to that of said sustaining voltage signal.

6. A method of erasing an electroluminescent display device of the type exhibiting voltage/luminance hysteresis, said device comprising an active layer of electroluminescent material, first and second electrodes of conductive material, each one disposed opposite a different face of the active layer, and first and second dielectric layers separating and insulating said electrodes from the active layer, said device including at least one region of luminescence sustained by the application of alternating polarity voltage pulses to the active layer through said electrodes, said method comprising the steps of:

(a) interrupting the application of said alternating polarity sustaining voltage pulses to said active layer, (b) applying an erase pulse that is (i) opposite in polarity to the last preceding sustaining pulse, (ii) longer in duration than individual sustaining pulses, and (iii) equal or lower in amplitude than the sustaining pulses, the amplitude and duration of the erase pulse being selected to provide a reduction in the active layer's internal electric field sufficient to produce extinction of luminescence in said region upon reapplication of said sustaining voltage pulses, and (c) reapplying said sustaining voltage pulses.

7. The method of claim 6, wherein said erase pulse has an amplitude substantially equal to that of said sustaining pulses.

8. The method of claim 6, wherein said sustaining voltage pulses have a substantially rectangular waveform.

* * * * *